United States Patent
Tortorella et al.

(10) Patent No.: US 12,076,809 B2
(45) Date of Patent: Sep. 3, 2024

(54) SURFACE PREPARATION SYSTEM AND METHOD FOR IMPROVING ADHESION

(71) Applicant: Deere & Company, Moline, IL (US)

(72) Inventors: Nathan F. Tortorella, Bettendorf, IA (US); Hema V. Guthy, Moline, IL (US); Sankaran Subramaniam, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 441 days.

(21) Appl. No.: 17/447,114

(22) Filed: Sep. 8, 2021

(65) Prior Publication Data

US 2021/0394300 A1 Dec. 23, 2021

Related U.S. Application Data

(62) Division of application No. 16/163,821, filed on Oct. 18, 2018, now Pat. No. 11,141,813.

(51) Int. Cl.
*B23K 26/00* (2014.01)
*B23K 103/10* (2006.01)
(Continued)

(52) U.S. Cl.
CPC .......... *B23K 26/0006* (2013.01); *C22C 21/06* (2013.01); *C22F 1/047* (2013.01); *B23K 2103/10* (2018.08)

(58) Field of Classification Search
CPC ............ B23K 2103/10; B23K 26/0006; B23K 26/0622; B23K 26/352; C22C 21/06; C22F 1/047
(Continued)

(56) References Cited

U.S. PATENT DOCUMENTS 4,624,752 A 11/1986 Arrowsmith et al.
6,037,060 A 3/2000 Blohowiak et al.
(Continued)

FOREIGN PATENT DOCUMENTS

| CN | 106702213 A | 5/2017 |
|---|---|---|
| JP | 2008223085 A | 9/2008 |
| WO | WO2014170946 A1 | 10/2014 |

OTHER PUBLICATIONS

Rui Zheng, Jianping Lin, Correlation between surface characteristics and static strength of adhesive-bonded magnesium AZ31B, The International Journal of Advanced Manufacturing Technology, dated Sep. 19, 2015, pp. 1661-1670 vol. 84, Issue 5-8, Springer-Verlag, London.

(Continued)

*Primary Examiner* — Dana Ross
*Assistant Examiner* — Joseph W Iskra

(57) ABSTRACT

A method for improving adhesion is disclosed. In one exemplary embodiment, the method comprises providing a base substrate and emitting energy from an energy source onto a surface of the base substrate at a predetermined wavelength to achieve one or more material properties. The one or more material properties including a surface elemental ratio of Aluminum to Magnesium between approximately 3 to 17, an elemental ratio of oxygen to carbon between 3 to 11, and a contact angle of less than 30 degrees such that upon application of an adhesive material an increased adhesive bond of predetermined strength is attained.

10 Claims, 6 Drawing Sheets

(51) Int. Cl.
*C22C 21/06* (2006.01)
*C22F 1/047* (2006.01)

(58) Field of Classification Search
USPC ...................................................... 219/121.6
See application file for complete search history.

(56) References Cited

U.S. PATENT DOCUMENTS

| | | |
|---|---|---|
| 6,565,927 B1 | 5/2003 | Drzal et al. |
| 8,987,632 B2 | 3/2015 | Wohl, Jr. et al. |
| 2014/0113144 A1* | 4/2014 | Loth .................. B08B 17/065 |
| | | 524/391 |
| 2015/0210951 A1* | 7/2015 | Aizenberg ............... B05D 5/08 |
| | | 141/1 |
| 2017/0104426 A1 | 4/2017 | Mills |
| 2018/0161874 A1 | 6/2018 | Nuechterlein et al. |

OTHER PUBLICATIONS

Nabil Anagreh, Amin Al Robaidi, Improvement in Adhesion Behavior of Aluminum Due to Surfaces Treatment with Arc Discharge, Jordan Journal of Mechanical and Industrial Engineering, dated Mar. 2010, pp. 330-339, vol. 4, No. 2.

* cited by examiner

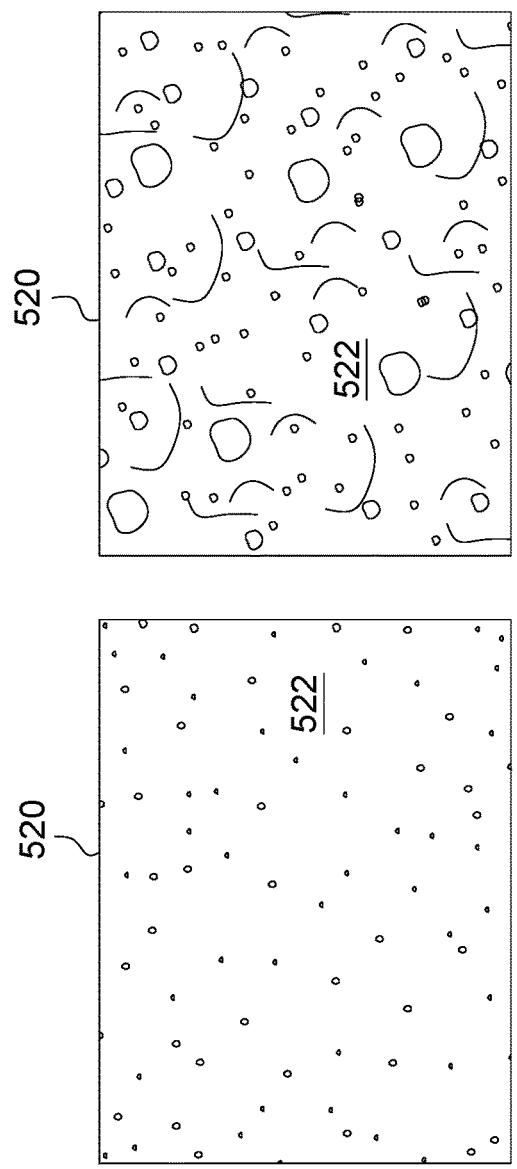
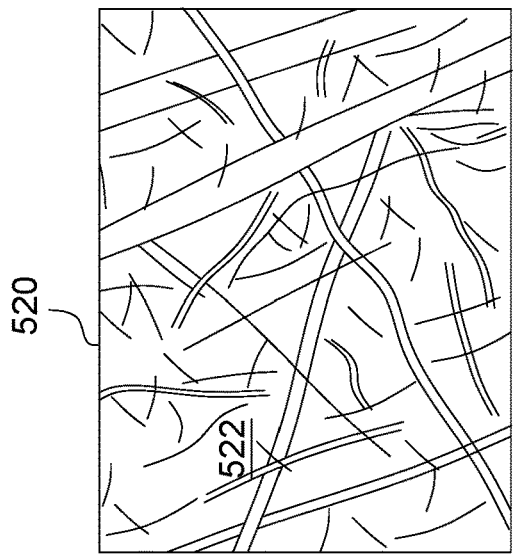
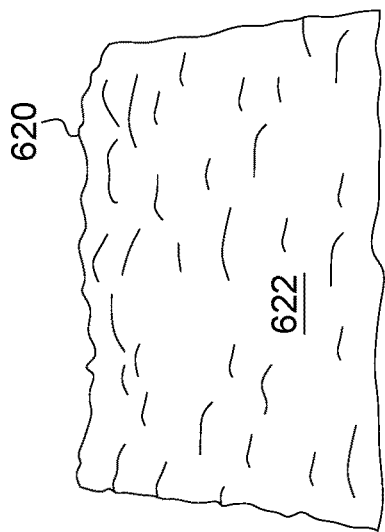
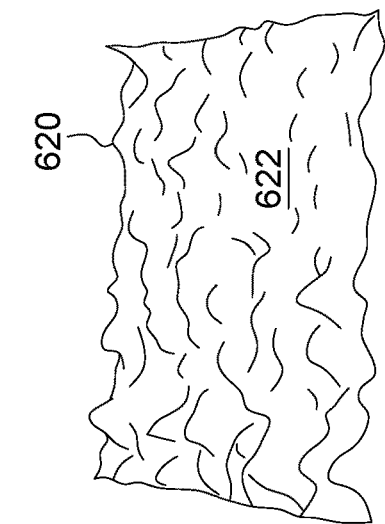
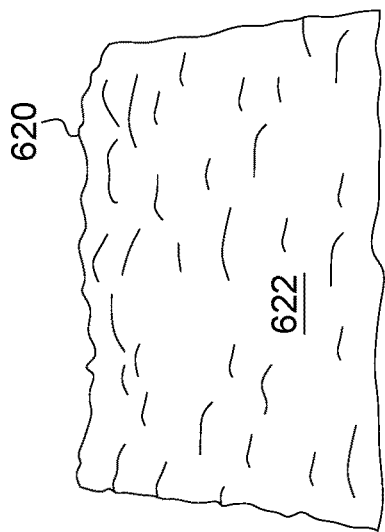
FIG. 6A  FIG. 6B  FIG. 6C
FIG. 7A  FIG. 7B  FIG. 7C

SURFACE PREPARATION SYSTEM AND METHOD FOR IMPROVING ADHESION

RELATED APPLICATIONS

This is a divisional application of U.S. application Ser. No. 16/163,821, titled SURFACE PREPARATION SYSTEM AND METHOD FOR IMPROVING ADHESION, filed Oct. 18, 2018 which is hereby incorporated by reference in its entirety.

FIELD OF THE DISCLOSURE

The present disclosure relates generally to pretreatment methods, and more particularly, to a surface preparation system and method for improving adhesion and fusion.

BACKGROUND OF THE DISCLOSURE

In equipment manufacture, welding and mechanical fastening techniques can be used to join metal parts or other structural components. Such techniques and methods, however, can be costly, energy intensive, and time consuming. For example, welding of aluminum parts, particularly 5000, 6000, and 300 series alloys, may require specialized equipment operated by specially trained welders to achieve a sufficient fusion. Additionally, the welding process may distort or change the material properties of a part due to heat affected zones induced in the metals.

With mechanical fastening techniques, holes located within the substrate may act as stress concentrators, which can lead to crack initiation and thereby affect the structural strength and longevity of the part. Other concerns with welding techniques include increased surface preparation. For example, wire brushing is common practice to remove hydroxides and oxides from Aluminum and steel surfaces. In the case of adhesive bonding using structural epoxies, wire brushing is not adequate for long term durability.

To address such concerns, multiple techniques and methods have been used to clean and prime aluminum surfaces for adhesive bonding. One such technique is anodizing, which is typically used in the aerospace industries for critical structures, and may encompass phosphoric, sulfuric-boric, tartaric or chromic acid anodizing. With such techniques, a thick porous layer of $Al_2O_3$ is created on the aluminum surface and an epoxy primer may be applied after anodizing to provide increased shelf life to the part to stabilize the interface once bonded, improving joint durability. Drawbacks to such techniques include energy consumption in the anodizing step, storage requirements for the required chemicals, as well as size limitations and constraints on the number of parts that can be treated at one time. To overcome drawbacks associated with anodizing, other conventional techniques employ the use of Sol-gel treatments, which can be effective at reducing corrosive effects, however, such techniques are costly and lead to finite shelf lives.

As such, there is a need in the art for a cost-effective surface preparation method that provides increased shelf life, as well as durable adhesive bonds of the metal parts.

SUMMARY OF THE DISCLOSURE

According to an aspect of the present disclosure, a method for improving adhesion is provided. The method comprises providing a base substrate and emitting energy from an energy source onto a surface of the base substrate at a predetermined wavelength to achieve one or more desired material properties. The desired material properties including a surface elemental ratio of Aluminum to Magnesium between approximately 3 to 17, an elemental ratio of oxygen to carbon between 3 to 11, and a contact angle of less than 30 degrees such that upon application of an adhesive material an increased adhesive bond of predetermined strength is attained.

According to another aspect of the present disclosure, an exemplary embodiment further discloses a method for improving adhesion that comprises providing a base substrate and emitting energy from an energy source onto a surface of the base substrate at a predetermined wavelength. Immersing the base substrate in a silane solution for approximately 120 seconds. Applying a deionized cold-water rinse to the base substrate for approximately 15 seconds; and drying the base substrate at a predetermined temperature for approximately 1 minute to achieve a desired material property. The desired material property including achieving an elemental ratio of aluminum to magnesium between approximately 3 to 17, an elemental ratio of oxygen to carbon between 3 to 11, and a contact angle of less than 30 degrees such that upon application of an adhesive material an increased adhesive bond of a predetermined strength is attained.

According to other aspects of the present disclosure, an exemplary embodiment also discloses a method for improving adhesion that comprises providing a base substrate and applying an abrasive material to at least one surface of the base substrate. Applying a silicate compound to at least one surface of the base substrate. Applying a cold-water rinse to the base substrate for approximately 1 minute. Applying a deionized cold-water rinse to the base substrate for approximately 1 minute; and drying the base substrate at a predetermined temperature for approximately 5 minutes to achieve a desired material property. The desired material property includes achieving an elemental ratio of aluminum to magnesium between approximately 3 to 17, an elemental ratio of oxygen to carbon between 3 to 11, and a contact angle of less than 30 degrees such that upon application of an adhesive material an increased adhesive bond of a predetermined strength is attained.

Other features and aspects will become apparent by consideration of the detailed description and accompanying drawings.

BRIEF DESCRIPTION OF THE DRAWINGS

The detailed description of the drawings refers to the accompanying figures in which:

FIG. 6A is a SEM image of a base substrate;

FIG. 6B is a SEM image of a base substrate;

FIG. 6C is a SEM image of a base substrate;

FIG. 7A is a three-dimensional profilometry image of a base substrate;

FIG. 7B is a three-dimensional profilometry image of a base substrate; and

FIG. 7C is a three-dimensional profilometry image of a base substrate.

Like reference numerals are used to indicate like elements throughout the several figures.

DETAILED DESCRIPTION OF THE DRAWINGS

Figure 1A:
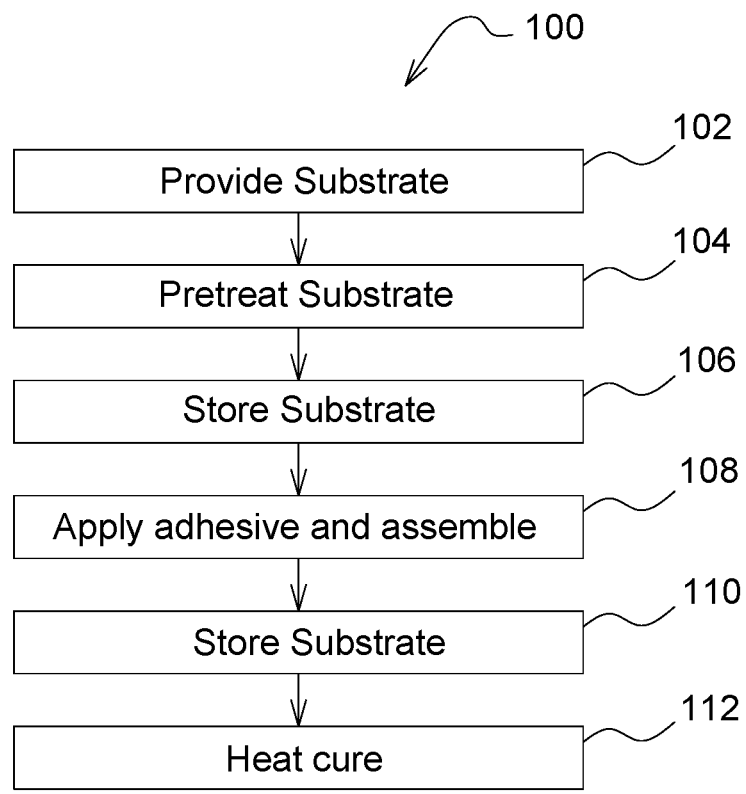
FIG. 1A is a flow diagram of a method of according to an embodiment.
Figure 1B:
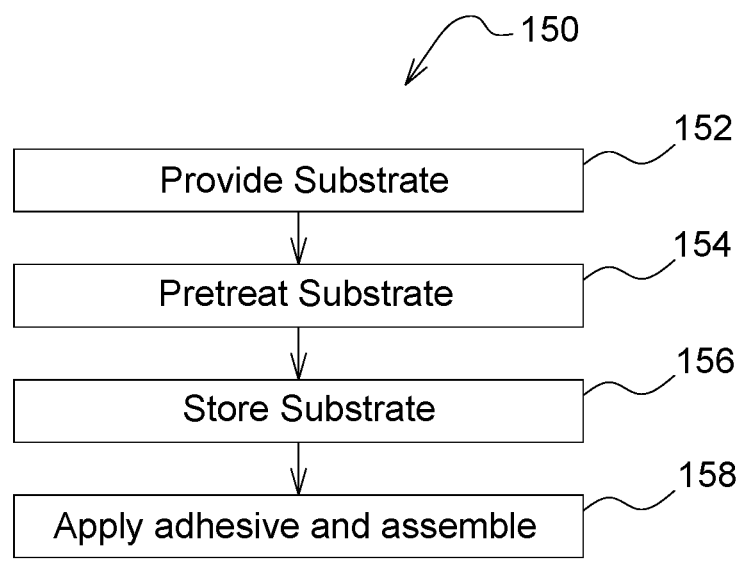
FIG. 1B is a flow diagram of a method according to an embodiment.

Referring to FIGS. 1A and 1B, a flow diagram of a method 100 and 150 for bonding an adhesive material to a base substrate is shown according to an embodiment. As will be discussed herein, the method 100 will refer to a surface preparation procedure that utilizes one-part adhesives, and the method 150 will refer to a surface preparation procedure that utilizes two-part adhesives. At 102 and 152, the base substrate, which can include a variety of suitable materials, is provided. For example, in some embodiments, the base substrate can comprise a metallic element such as an aluminum alloy including, without limitation, 6061 T6, 6005, 5052 H32, 5456, A356, A380 alloys. At 104 and 154, the base substrate can be pretreated utilizing one or more pretreatment methods and with at least one pretreatment source (e.g., chemical, mechanical, thermal pretreatment source), which can and will vary based on application and/or specification requirements as will be discussed with reference to FIGS. 2, 4, and 5.

Once the base substrate is pretreated, it can be stored at 106 and 156 in a storage location for a predetermined period, which may be determined based on the selected aluminum alloy. For example, the shelf life of some aluminum alloys (i.e., the base substrate) can reach up to 18 days prior to adhesive bonding. Following storage, the adhesive material is applied to the base substrate and a second substrate is joined to the base substrate via the adhesive material to form a bonded substrate at 108 and 158.

As will be appreciated by those skilled in the art, distinct curing techniques are required for one-part and two-part adhesive compositions. For example, referring now to FIG. 1A and method 100, for adhesive materials having a one-part composition the bonded substrate can be stored again at 110 and cured at 112 in some embodiments. For example, one-part adhesives can comprise a latent catalyst requiring the use of various heating methods such as oven, infrared, or other suitable heating techniques to reach full cure. Two-part adhesives have longer storage times (i.e., shelf lives) and can be cured at temperatures such as room temperature and do not require heat or high temperature curing, therefore two-part adhesives can be processed utilizing methods such as method 150 (FIG. 1B).

Additionally, it should be also noted that the selected curing technique and method will vary according to the material composition and selection of the base substrate. For example, for higher curing temperatures, metallic base substrates may be more suitable, whereas, polymeric or other suitable materials may be used for lower curing temperatures. For example, for one-part adhesive materials such as Henkel Terson 5089, which can be cured at temperatures of approximately 160° C. or more, the base substrate can comprise one or more of the following alloys in sheet or extrusion form: 6061, 6005, 5052, 5456, and casting alloys such as A356 and A380. For two-part adhesives, which can be cured at substantially lower temperatures (e.g., 20° C.), the base substrate can comprise one or more of the following alloys in sheet or extrusion form: 6061, 6005, 5052, 5456, and casting alloys such as A356 and A380.

Referring now to FIGS. 2-5, various pretreatment sources and methods can be used to prepare and/or modify surface characteristics of the base substrate as previously discussed. In one embodiment, a first pretreatment method 200 can be used to modify at least one surface characteristic of the base substrate. At 202, a first base substrate can be provided in or on a processing structure such as a table or chamber. Next at 204, a first pretreatment source can be provided, which can and will vary based on application and/or specification requirements as will be discussed herein. In some embodiments, the first pretreatment source can comprise a laser energy source that is configured to emit a beam of energy in pulsed durations (e.g., femtosecond to nanosecond durations) at various wavelengths (e.g., 900 to 1200 nm) onto a surface of the first base substrate at 206. For example, the wavelength and device parameters can vary based on the selected laser energy source as shown in Table 1. In Table 1, device parameters for two exemplary laser energy sources, an Adapt cleanLaser and an IPG Phonotonics laser, are listed. It should be noted, however, that in other embodiments, additional laser energy sources such as Er:YSGG, Ho:YSGG, or other suitable devices may be used which operate within a range of wavelengths and electromagnetic spectrums. lasers that emit high intensity pulses of ultraviolet (UV) light, typically with pulse durations in the approximately 1 to 100 nanosecond range.

Based on the selected laser device (i.e., Adapt cleanLaser or IPG Phonotonics), a power output level of the first pretreatment source can range between approximately 100 watts to 950 watts. Other device parameters can also vary according to the selected device. For example, the energy per pulse, power density, overlap percentage, and pulse frequency each may vary according to the selected laser device as shown in Table 1. It should also be noted that because the first pretreatment source is at a high intensity and small spot size (i.e., its scan speed is relatively slow and laser optics are close to the base substrate) this can result in frequent cleaning of dust and soot, thereby increasing the overall output level of the first pretreatment source.

TABLE 1

| Designation | Supplier 1: Adapt cleanLaser | | Supplier 2: IPG Photonics |
| --- | --- | --- | --- |
| Laser power source | CL100 | CL300 | IPG YLP-HP-100-25x100-10-1000 |
| Power (W) | 100 | 300 | 800 |
| Energy per pulse | | 250 (KW) | 40 (mJ) |
| Power density (MW/mm^2) | | | 3.97 |
| Overlap (%) | 50 | 50 | 30 |
| Pulse Frequency (kHz) | 100 or 200 | 12 | 20 |

Figure 3A:
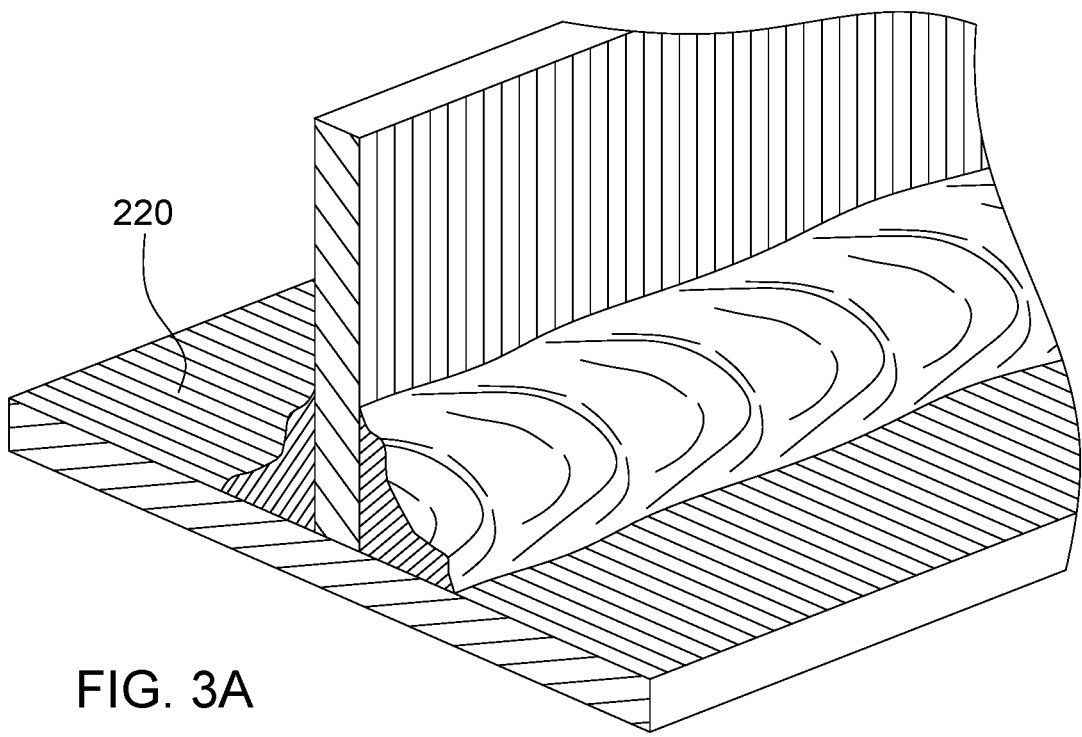
FIG. 3A is cross-sectional image of a MIG weld on a pretreated substrate.
Figure 3B:
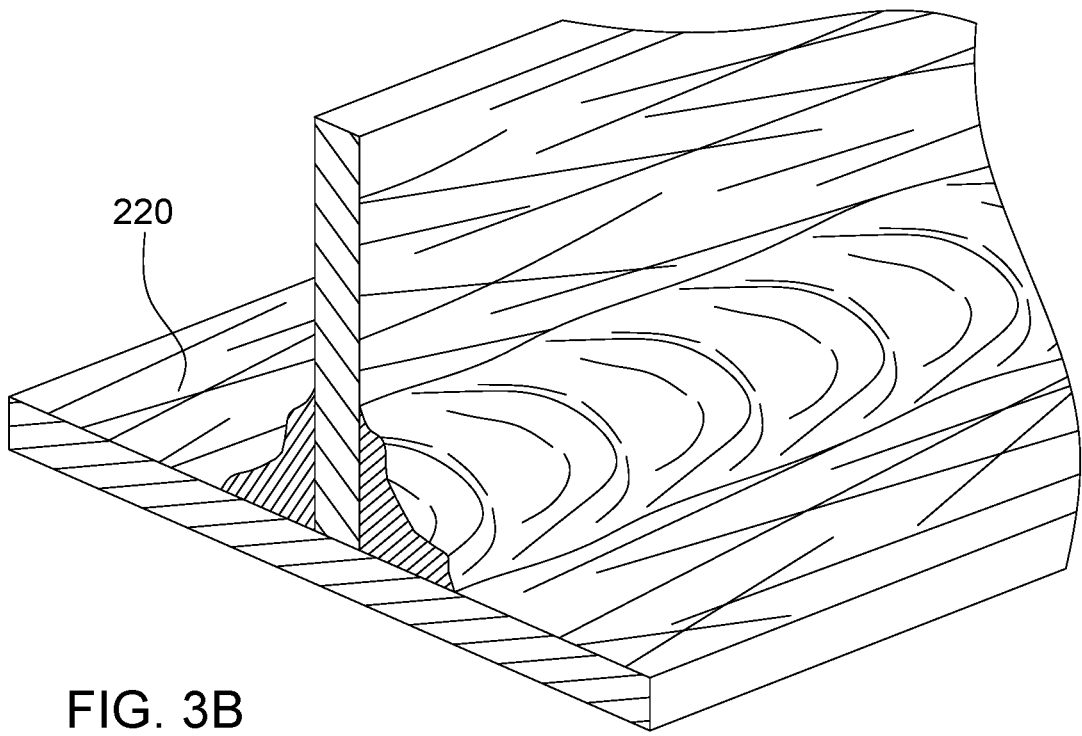
FIG. 3B is cross-sectional image of a MIG weld on a pretreated substrate.

Referring now to FIGS. 3A and 3B, the first pretreatment source can also help to substantially reduce weld porosity. For example, FIGS. 3A and 3B illustrate samples of the first base substrate (e.g., 5052 H32 aluminum alloy) that were subjected to the first pretreatment source and welded approximately 7 days following pretreatment. As shown, on laser cleaned or pretreated surfaces (FIG. 3A), the accumulation of black soot and weld spatter is significantly reduced as compared to wire brushed surfaces which have not been subjected to pretreatment (FIG. 3B). Additionally, with such techniques, the welding process is not inhibited although the laser cleaned surface of the first base substrate may contain a high percentage of Aluminum oxide, which is refractory in nature and not amenable to known welding practices.

Figure 4:
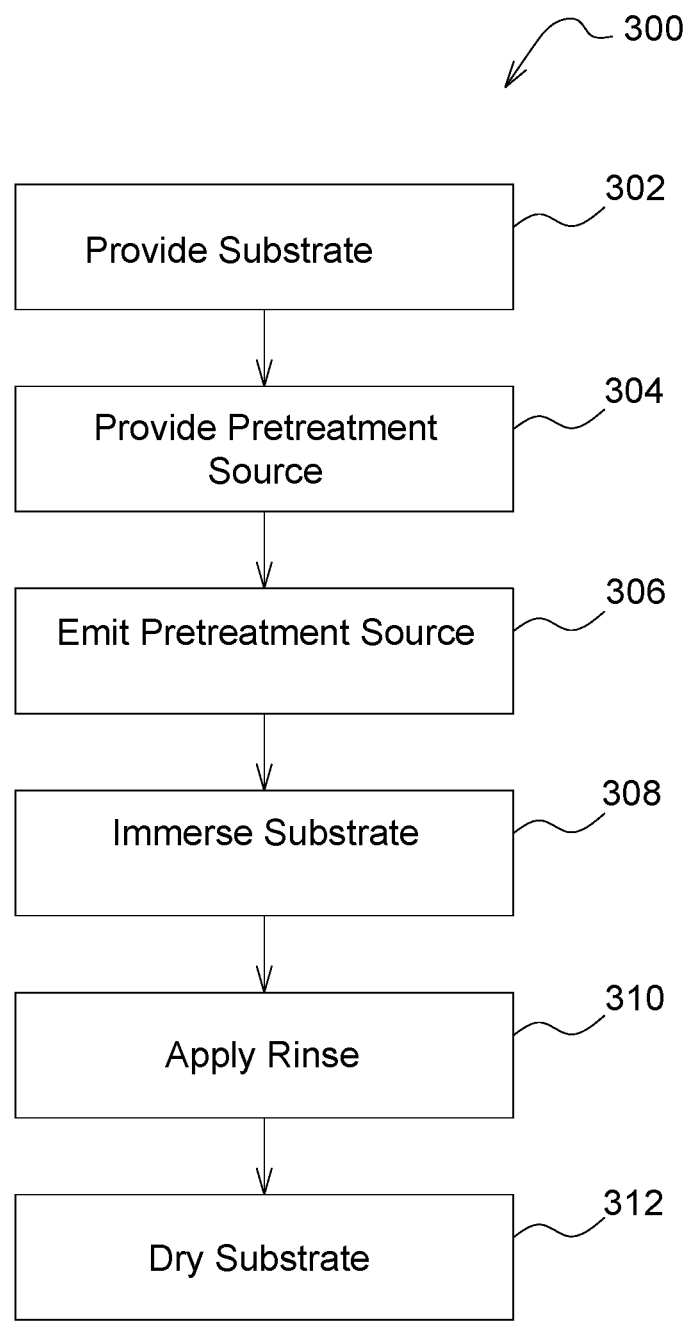
FIG. 4 is a flow diagram of a surface preparation method according to an embodiment.

In other embodiments, referring now to FIG. 4, a second pretreatment method 300 can be utilized to modify the surface characteristics of a second base substrate which is provided at 302. As illustrated in FIG. 4 and Table 2, the second pretreatment method 300 can comprise a second pretreatment source, which, similar to the first pretreatment method 200, can comprise an IPG Photonics laser and an Adapt cleanLaser in some embodiments.

TABLE 2

| Laser pretreatment using one of the following: | 1 minute after laser cleaning, Immerse part for 120 seconds in Coral Decorrdal 600; 161K019 sealer | Deionized cold-water rinse, 15 seconds | Hot air dry for 1 minute. |
|---|---|---|---|
| 1) IPG photonics YLP-HP-100-25x100-10-1000 |  |  |  |
| 2) Adapt cleanLaser CL300, 160 mm focal length, 15 kHz, 2500 mm/s, 1 pass |  |  |  |

As will be appreciated by one skilled in the art, the second pretreatment method 300 can be particularly advantageous when faster laser processing speeds are desired and/or laser optics cannot achieve a desired focal distance. At 304, the second pretreatment source is provided and can be configured to emit a beam of energy onto a surface of the second base substrate at 306. Following laser cleaning (e.g., approximately 1 minute following emission of the second pretreatment source), the second base substrate can be immersed into a chemical solution such as a silane solution for approximately 120 seconds at 308. In other embodiments, other chemical solutions can be used to functionalize the surface of the second base substrate if the solution wets the laser cleaned surface. For example, in various embodiments, the chemical solution can be acid, base, or organic in nature and may also contain reactive organ-silanes such as Coral Decorrdal 600.

Once the chemical solution is applied, the second base substrate is subjected to a deionized cold-water rinse at 310 for approximately 15 seconds, and can be dried for approximately 1 minute at 312. In various embodiments, the selected drying technique may vary. For example, in some embodiments, the second base substrate can be dried utilizing an air-drying device (e.g., a warm or hot air-drying device), whereas, in other embodiments, other suitable drying devices may be employed.

Figure 5:
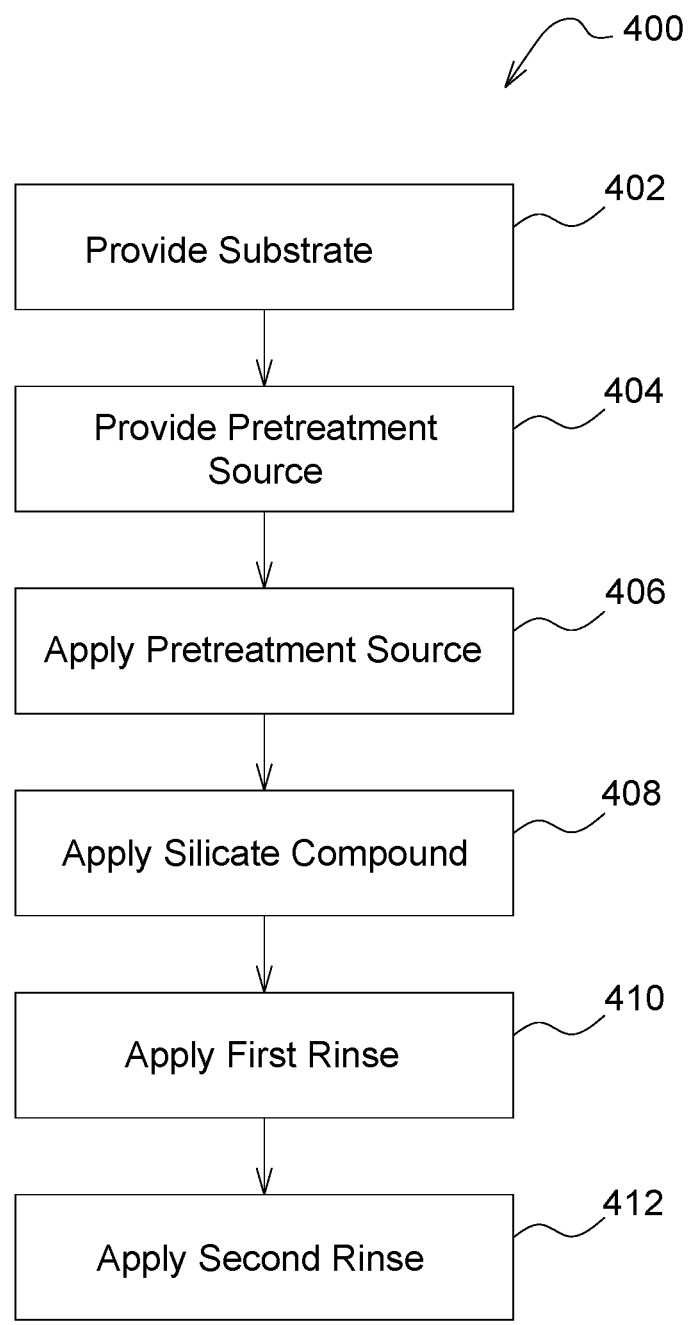
FIG. 5 is a flow diagram of a surface preparation method according to an embodiment.

In FIG. 5, a third pretreatment method 400 is shown. In embodiments, the third pretreatment method 400 can comprise a third pretreatment source. The third pretreatment source, which, in one embodiment can comprise an abrasive element, is applied to at least one surface of the third base substrate at 406. As shown in Table 3, the abrasive element can comprise elements such as Scotch-brite 7447 or Cubitron II having a grit size of approximately 36 grit or greater. Similar to pretreatment methods 200 and 300, a base substrate (i.e., a third base substrate) and the pretreatment source (i.e., the third pretreatment source) can be provided at 402 and 404. Next at 408, a silicate compound is applied to at least one surface of the third base substrate.

Once the silicate compound is applied, the third base substrate can be subjected to at least two rinse operations. For example, at 410, a cold-water rinse (i.e., a first rinse) can be applied to the third base substrate for approximately 1 minute. After the cold-water rinse, a deionized cold-water rinse (i.e., a second rinse) can be applied to the third base substrate for a predetermined time (e.g., approximately 1 minute). Next at 412, in some embodiments, the third base substrate can be dried at a predetermined temperature (e.g., 200° F.) for approximately 5 minutes utilizing drying techniques such as oven drying as identified in Table 3.

TABLE 3

| Mechanical abrasion using one of the following: | Silicated alkaline clean Bonderite C-AK 1520R (5%, 125° F., 1 minute) | cold water rinse, 1 minute | DI water rinse, 1 minute | Oven dry, 200° F./5 minutes |
|---|---|---|---|---|
| 1) 3M Scotch-brite 7447 |  |  |  |  |
| 2) 3M Cubitron 11 (36 grit) |  |  |  |  |
| 3) 3M Cubitron 11 (60 grit) |  |  |  |  |

The effect of the various pretreatment methods 200-400 on the base substrates (i.e., first, second, or third base substrate) is shown in Tables 4 and 5. One or more surface characteristics such as, e.g., a surface adhesion of the base substrates can be modified utilizing the pretreatment methods 200-400. For example, once a threshold value (e.g., elemental ratio values and/or water contact angle) for at least three material properties is achieved, the surface characteristic of the base substrates can be modified and improved. As shown in Tables 4 and 5, the at least three material properties can include, without limitation, an Aluminum to Magnesium ratio, an Oxygen to Carbon ratio, and a water contact angle. The threshold value for each of the elemental ratios (i.e., Aluminum to Magnesium ratio and Oxygen to Carbon ratio) can include a ratio of at least 3 or greater, and an angle of at least 30 degrees or less for the water contact angle.

Although two elemental ratios are identified in Tables 4 and 5, it should be noted that additional elements may be present before, during, and after pretreatment which may also affect the one or more surface characteristics. For example, with pretreatment methods such as pretreatment 400 (abrasion and Bonderite pretreatment), silicon and potassium ions can be deposited onto a surface of the base substrate (i.e., the third base substrate), which may spoil some chemistries, such as peroxide-initiated curing of acrylics. It should also be noted that modification of the surface characteristic can increase bond strength such that upon application of the adhesive material (e.g., one-part or two-part adhesive) stronger joints are formed. Additionally, as discussed with reference to FIGS. 1A and 1B, a shelf life of the base substrates can increase when the threshold value for each of the material properties is reached. For example, the shelf life may reach 18 days based on the selected aluminum alloy and storage conditions.

In various embodiments, one or more sensor devices can be used to measure and/or detect material properties of the base substrates. For example, in some embodiments, a sensor device such as an X-ray photoelectron spectroscopy (XPS) can be used to measure the elemental ratios (\) of Aluminum to Magnesium and Oxygen to Carbon. The sensor device can be configured to scan an upper surface layer (e.g., a survey scan) of the base substrates at approximately 3 nanometers (nm) in depth, for example. A surface analyst tool (e.g., a Brighton Surface Analyst) can be used to measure the water contact angles.

Referring again to Tables 4 and 5, the base substrates were subjected to wedge and stress analyses to ensure durability. For example, for wedge analysis, the base substrates (i.e., test sample) were tested at a temperature of approximately 38° C. with 100% relative humidity (RH) over a two-day period according to ASTM D3762 testing standards. Similarly, for stress analysis, the base substrates were tested in an environment having a temperature of approximately 38° C. and a relative humidity (RH) of 100%. During the stress analysis, the base substrates were subjected to a pressure of approximately 25% of the ultimate shear strength over 40 cycles in accordance with Ford Laboratory Test Method FLTM BV 101-07 to determine durability, with each exhibiting a wedge crack growth of less than 6 mm.

TABLE 4

Specifications for Aluminum Alloy Pretreatment and Resulting Properties

| Alloy | Al:Mg Ratio† | O:C Ratio† | Contact angle (°) + | Wedge cohesive failure (%)* | Wedge crack growth (mm)* |
|---|---|---|---|---|---|
| 6061 T6 | >3 | >5 | <30 | >90 | <6 |
| 6005 | >10 | >5 | <20 | | |
| 5052 H32 | >8 | >4 | <20 | | |
| 5456 | >4 | >4 | <20 | | |
| A356 machined | >10 | >5 | <20 | | |
| A380 | >8 | >3 | <20 | | |

TABLE 5

Data from as received and pretreated Aluminum specimens

| Aluminum alloy | Al:Mg Ratio | O:C Ratio | Contact angle (°) | Median wedge cohesive failure (%) | Median wedge crack growth (mm) | Stress durability 1$^{st}$ failure |
|---|---|---|---|---|---|---|
| 6061 T6 | 9.8 | 10 | 14 | 100 | 4 | No failure |
| 6061 T6 | 12 | 9.5 | 28 | 95 | 5 | No failure |
| 6061 T6 | 3.5 | 5.4 | 9 | 90 | 4.4 | No failure |
| 6061 T6 | 6.4 | 3.2 | 79 | | Did not test | |
| 6061 T6 | 0.2 | 3 | 97 | 0 | 59 | Day 1 |
| 6005 | 4.4 | 7 | 6 | 60 | 8 | Did not test |
| 6005 | 16.2 | 6.8 | 17 | 100 | 2.5 | Did not test |
| 6005 | 0.22 | 1.9 | 85 | 0 | 121 | Did not test |
| 5052 H32 | 10.1 | 5.3 | 13 | 100 | 1 | Did not test |
| 5052 H32 | 8.4 | 4.7 | 13 | 100 | 1.5 | Did not test |
| 5052 H32 | 1.2 | 0.5 | 90 | 40 | 10 | Did not test |
| 5456 | 5.5 | 5 | 12 | 100 | 2 | Did not test |
| 5456 | 3.4 | 1 | 76 | 0 | 47.5 | Did not test |

TABLE 5-continued

Data from as received and pretreated Aluminum specimens

| Aluminum alloy | Al:Mg Ratio | O:C Ratio | Contact angle (°) | Median wedge cohesive failure (%) | Median wedge crack growth (mm) | Stress durability 1st failure |
|---|---|---|---|---|---|---|
| A356 machined† | 16.6 | 5.9 | 16 | 98 | 3.6 | Did not test |
| A356 machined† | 6.2 | 1.6 | 87 | | Did not test | |
| A380 as-cast‡ | 14 | 3.3 | 17 | 100 | 3.8 | Did not test |
| A380 as-cast‡ | 9.2 | 3.8 | 8 | 100 | 1.8 | Did not test |
| A380 as-cast‡ | 2.5 | 0.5 | 87 | 1 | 97 | Did not test |

Figure 2:
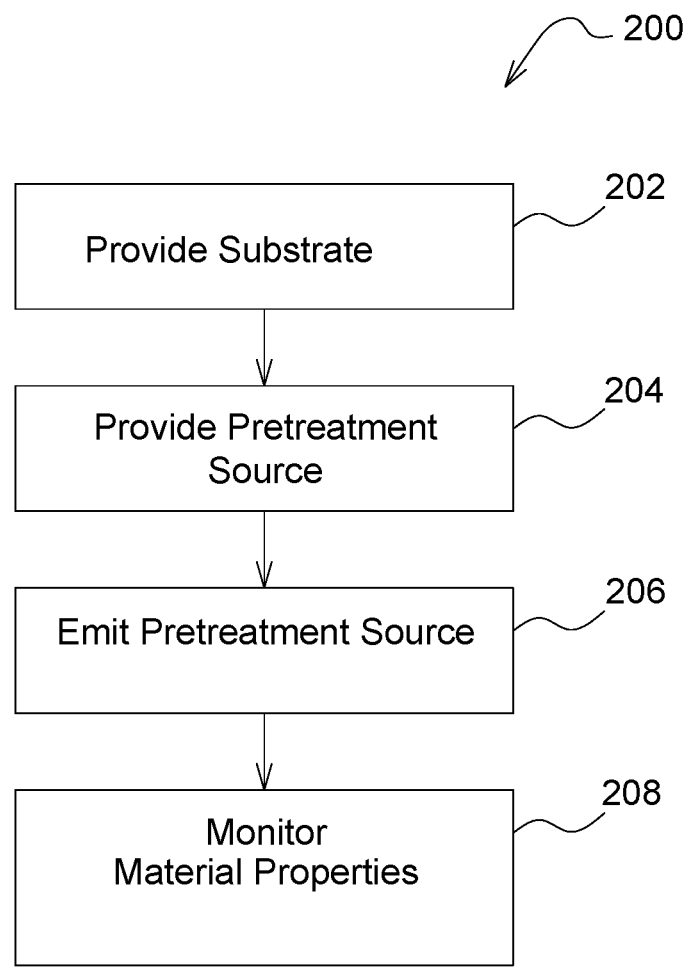
FIG. 2 is a flow diagram of a surface preparation method according to an embodiment.

Referring now to FIGS. 6A-7C, exemplary images of a surface of the base substrate including, e.g., an aluminum alloy 6061 T6 are shown before and after application of the one or more pretreatment method 200, 300, or 400 discussed with reference to FIGS. 2-4. FIGS. 6A and 7A illustrate microscopic images of the surface of the first base substrate prior to pretreatment (i.e., as received surfaces). In FIGS. 6B, 6C, 7B, and 7C, microscopic images of the surface of the first base substrate following pretreatment utilizing the pretreatment 200 are shown.

A variety of imaging devices having high resolution magnification (e.g., 500×-1500×) can be used to generate images of the surface of the base substrate. In one embodiment, referring now to FIGS. 6A-6C, a scanned electron microscope (SEM) comprising a back-scattered electron detector is used to generate one or more images the surface (i.e., surface 522) of the base substrate (i.e., base substrate 520). Each of the images in FIGS. 6A-6C were observed at a magnification of about 500×. For example, FIG. 6B is an SEM image of the surface 522 which has been subjected to the first pretreatment source (e.g., laser energy source) utilizing the first pretreatment method 200 discussed with reference to FIG. 2. In FIG. 6C, an SEM image of the surface 622 pretreated utilizing the pretreatment method 400 discussed with reference to FIG. 5 is shown.

In other embodiments, other suitable imaging devices may be used. For example, as shown in FIGS. 7A-7C, an imaging device such as a 3-D optical profilometer can be used to capture topographical images of the surface (e.g., surface 622) of the base substrate at an increased magnification of about 1500×. Similar to FIGS. 6B and 6C, FIGS. 7B and 7C also illustrate surfaces (i.e., surface 722) of the base substrate that have been pretreated utilizing the pretreatment methods 200 and 400. It should also be noted that the images shown in FIGS. 6B, 6C, 7B, and 7C illustrate how pretreatments can increase roughness of the surfaces 522, 622, which, in turn, facilitates improved surface adhesion. For example, roughness of the surfaces 522, 622 can increase by 200% after laser cleaning (i.e., pretreatment method 200).

Without in any way limiting the scope, interpretation, or application of the claims appearing below, a technical effect of one or more of the example embodiments disclosed herein is a surface preparation system and method for improving adhesion. The method is particularly advantageous in that it facilitates improved surface adhesion of one or more substrates which result in long lasting joints for structural adhesive bonding and/or welding applications. For example, a durable joint can be produced when specific ratios of elements such as carbon, oxygen, aluminum, and magnesium are created.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A method for improving adhesion, the method comprising the steps of:
   providing a base substrate; and
   achieving a desired material property by:
   immersing the base substrate in a silane solution;
   applying a deionized cold-water rinse to the base substrate; and
   drying the base substrate at a predetermined temperature;
   wherein the desired material property includes achieving an elemental ratio of aluminum to magnesium between approximately 3 to 17 of the base substrate, an elemental ratio of oxygen to carbon between 3 to 11 of the base substrate, and a contact angle of less than 30 degrees formed on the base substrate such that upon application, to the base substrate, of an adhesive material an increased adhesive bond of a predetermined strength is attained.

2. The method of claim 1, wherein the base substrate comprises one or more of the following aluminum alloys: 6061, 6005, 5052, 5456, A356, or A380.

3. The method of claim 1, wherein drying the base substrate comprises air drying the base substrate.

4. The method of claim 1, wherein the immersing the base substrate in the silane solution is for approximately 120 seconds.

5. The method of claim 1, wherein the applying a deionized cold-water rinse to the base substrate is for approximately 15 seconds.

6. The method of claim 1, wherein the drying the base substrate at the predetermined temperature is for approximately 1 minute.

7. The method of claim 1, further comprising emitting the energy source onto at least one surface of the base substrate is at a predetermined wavelength.

8. The method of claim 7, wherein the energy source comprises a laser source.

9. The method of claim 8, wherein the laser source comprises a pulsed nanosecond laser configured to emit energy at a wavelength of approximately 1064 nm.

10. The method of claim 7, wherein the immersing the base substrate in the silane solution is performed approximately 1-minute following emission of the energy source.

* * * * *